United States Patent [19]

Ahrens et al.

[11] 4,020,531
[45] May 3, 1977

[54] CLAMP FOR WAVEGUIDES, CABLE OR THE LIKE

[75] Inventors: Günter Ahrens, Langenhagen; Hans Hermann Hesse, Berlin; Günter Beierfuss, Berlin; Erich Wagner, Berlin, all of Germany

[73] Assignee: Kabel-und Metallwerke Gutenhoffnungshutte Aktiengesellschaft, Hannover, Germany

[22] Filed: June 11, 1975

[21] Appl. No.: 585,805

[30] Foreign Application Priority Data

June 13, 1974 Germany .......................... 2428529
Apr. 5, 1975 Germany .......................... 2514897

[52] U.S. Cl. .............................. 24/284; 24/243 B; 248/73; 248/74 R
[51] Int. Cl.² ................. B65D 63/00; A44B 11/00; F16L 3/08
[58] Field of Search ................. 333/95 R; 343/878; 248/43, 40, 62, 72, 73, 74 A, 74 B, 74 R; 24/81 CC, 243 R, 243 AB, 243 AE, 243 C, 243 CC, 284, 285, 243 H, 286, 200 W

[56] References Cited

UNITED STATES PATENTS

| | | | |
|---|---|---|---|
| 991,192 | 5/1911 | Battenfeld | 248/74 B |
| 1,210,701 | 1/1917 | Ryden | 248/74 R |
| 1,764,071 | 6/1930 | Foulke | 248/40 |
| 2,303,108 | 11/1942 | Blackburn | 248/73 UX |
| 2,440,260 | 4/1948 | Gall | 24/20 CW UX |
| 2,494,881 | 1/1950 | Kost | 248/73 UX |
| 2,961,479 | 11/1960 | Bertling | 248/74 A X |
| 3,245,642 | 4/1966 | Dicke | 343/878 X |
| 3,292,888 | 12/1966 | Fischer | 248/72 |
| 3,301,514 | 1/1967 | Sugaya | 248/73 |
| 3,721,412 | 3/1973 | Kindorf | 248/73 |

FOREIGN PATENTS OR APPLICATIONS

| | | | |
|---|---|---|---|
| 1,007,098 | 2/1952 | France | 248/74 R |
| 1,121,357 | 4/1956 | France | 248/74 A |
| 1,142,854 | 4/1957 | France | 248/74 R |
| 285,561 | 1/1953 | Switzerland | 248/74 R |
| 352,114 | 7/1931 | United Kingdom | 248/74 R |

OTHER PUBLICATIONS

IBM Technical Disclosure Bulletin Uberbacher, vol. 3, No. 6, 11/1960, pp. 4 and 5.

Primary Examiner—Paul R. Gilliam
Assistant Examiner—V. Sakran
Attorney, Agent, or Firm—Ralf H. Siegemund

[57] ABSTRACT

A clamp for waveguides or other cable has two members with overall semicylindrical contour, one being stiff, the other one being constructed from two flexible, integrally joint portions. The two members are bolted together on one side and bolted or hinged on the other side. The stiffer member can be separately bolted to a support by means of different kinds of bolts and fastening rods.

18 Claims, 9 Drawing Figures

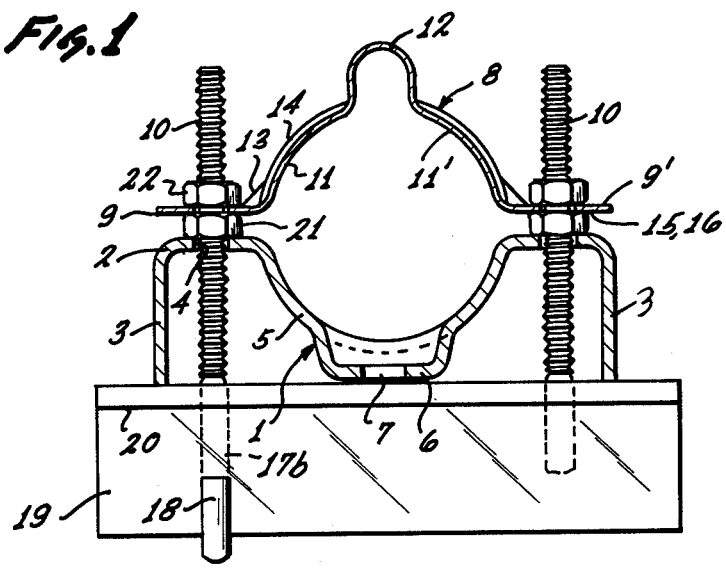
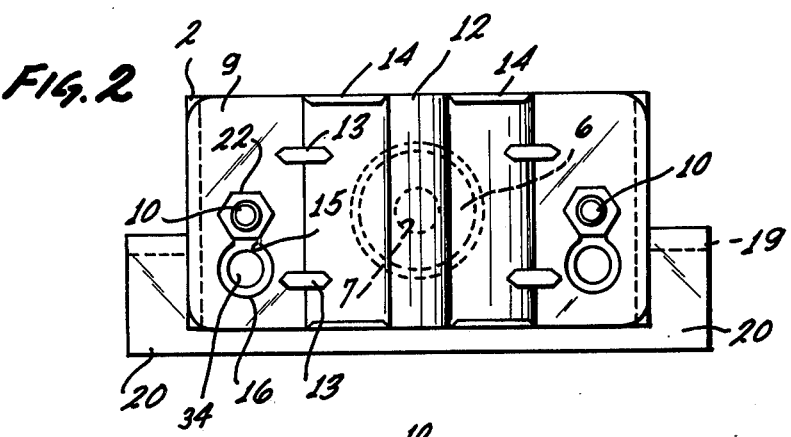
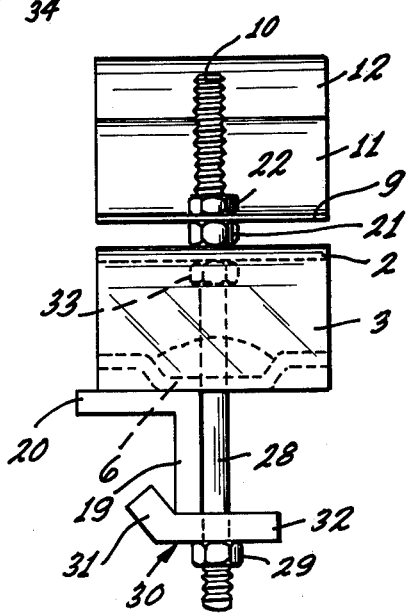

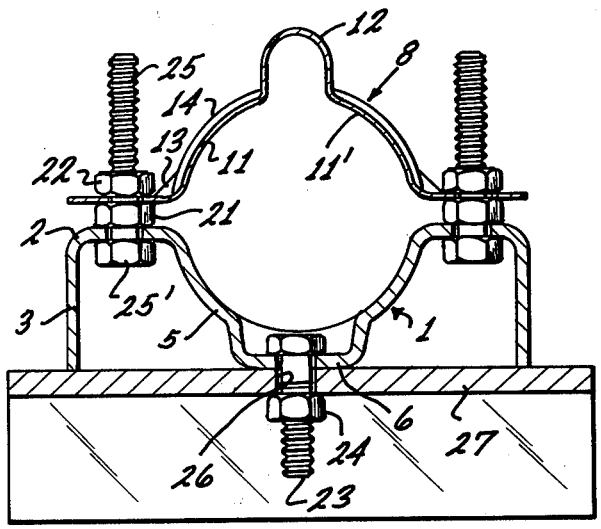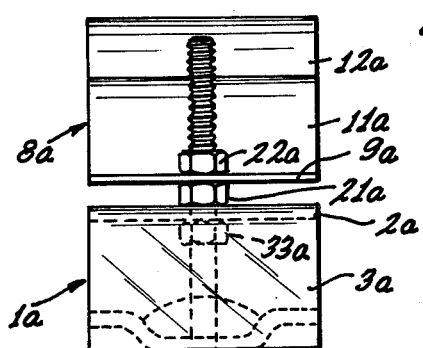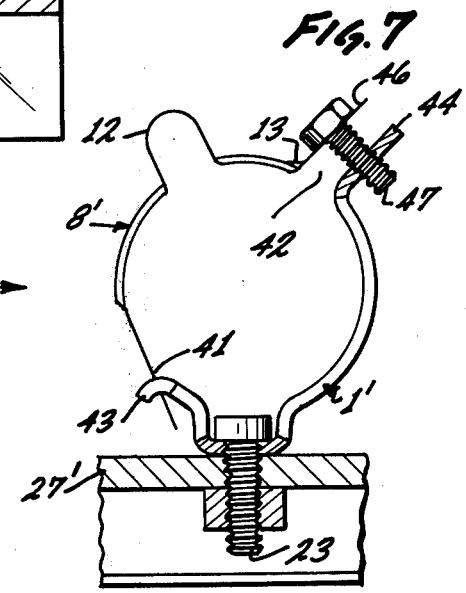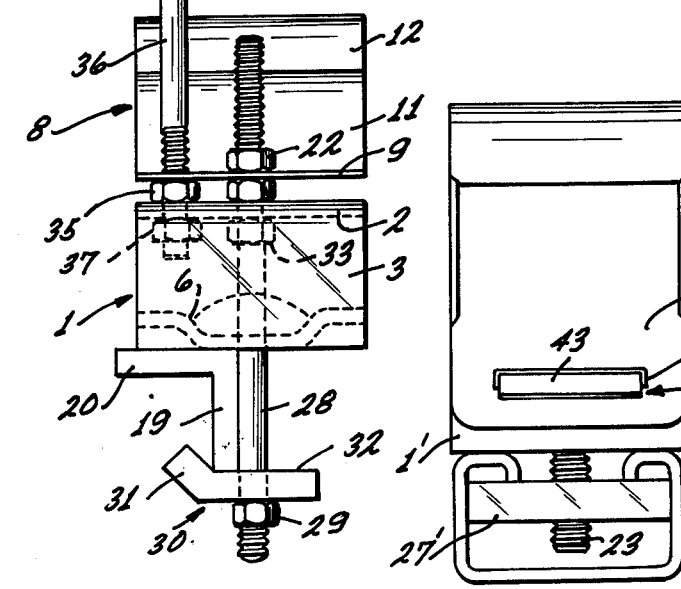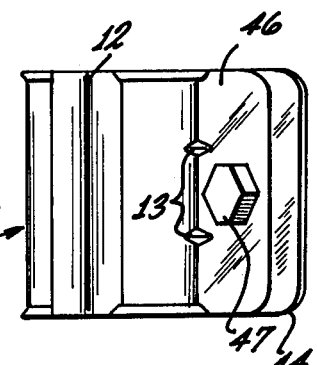

CLAMP FOR WAVEGUIDES, CABLE OR THE LIKE

BACKGROUND OF THE INVENTION

The present invention relates to a clamp particularly of the type by means of which waveguides are connected, held and fastened to support structures such as transmitter towers or the like.

In order to fasten cable of different diameter to support structure, clamps are used having a lower portion which is fastened to the support structure and an upper portion which is fastened to the lower portion while the cable is held inbetween. The two portions are of complementary contour to receive and hold the cable accordingly.

This type of clamp has been used quite successfully for fastening and holding cable with a yielding insulation jacket. The respective legs of these clamp parts each extending laterally from the contoured portion, are spaced apart by a distance which depends on the diameter of the cable (prior to tightening). For large cable that distance is for example 4 mm. Upon insertion of tightening bolts or the like these legs of the two clamp parts are forced towards each other until abutting while the cable jacket undergoes some deformation on account of the clamping action. This particular deformation is actually part of the interaction between clamp and cable and contributes to the holding and clamping thereof.

It is readily apparent, that waveguides cannot be fastened and held in that manner, because one cannot squeeze them in the stated fashion. The waveguide duct proper does have a jacket, but a deformation is likely to be transmitted to the tube, and squeezing of this waveguide duct would result in a local protrusion which causes reflection of transmitted wave energy. Thus, such a deformation must be prevented, but the waveguide must still be fastened where installed. By way of example, such a waveguide cable must be mounted to the tower of a transmitting antenna or the like. A waveguide is required here to run up for several or many hundred feet, but must be firmly held e.g. against wind etc.

One has to consider also, that the fastening of a waveguide and installing it on such a tower must be a simple procedure which does not require extensive manipulations by the work-man. For example, the probability that nuts, bolts or the like are accidentally dropped from great heights should be avoided because of possible injury to people and other damages.

DESCRIPTION OF THE INVENTION

It is an object of the present invention to provide for a new and improved clamp which is suitable for holding waveguides without requiring deformation of the jacket thereof for holding action.

It is another object of the present invention to provide for a two part clamp of which one part can be prepared to establish a subassembly so that the other part can be fastened thereto in an extremely simple manner. Conceivably, the one part should even be mounted earlier to the frame or other support structure.

In accordance with the preferred embodiment of the invention, a two member clamp is suggested in which a first, relatively rigid clamp member is of semicylindrical contour and has on one (azimuthal) end an outwardly extending flat arm and means for fastening are provided at the other, diagonally opposite end; these means for fastening may be another flat arm or an releasible hinge element; the first clamp member being additionally constructed for engagement with a flat supporting surface. The second clamp part has contour to complement the first one for abutment around a (cylindrical) cable or waveguide. Its contoured portion is divided into two curved segments being made stiff individually, and a flexible, outwardly bulging, corrugation like connection for the two segments extending in the axis of the cylindrical contours integrally and flexibly joins these two segments. The second clamp member is also provided with one arm for spaced connection through bolting to the arm of the first mentioned clamp member; the other (azimuthal) end of the second clamp has a means cooperating with the means for fastening with the first clamp member. These cooperating means may be another arm for analogous bolting or a complementary hinge part.

The preferred construction includes additionally a depression in the first clamp member for engagement with the part to which the clamp is to be fastened. That depression is either centrally provided or closer to one of the ends. In the case of a central disposition and for two arms each on each clamp member, the arms of the first, rigid one are preferably continued in down facing flanges whose edges may be flush with the bottom of the depression, if provided, to obtain additional engagement with the support surface to which the first rigid clamp member is to be fastened. The bottom of the depression of the rigid clamp member should bear against the support frame or construction part in either case and regardless of its location, central or off center.

It can thus be seen that the clamp proper consists of parts one of which is stiff and rigid in its entirety while the second member has been made stiff in parts e.g. through corrugation indents in the transition zone to the respective arm or arms and through flanging of the respective axial ends, and the flexibility of that second member is limited to the portions joining these stiffened portions and having outwardly bulging contour. Thus, all those portions of the clamp which will abut the cable or waveguide are rather stiff, and do not change curvature upon clamping while flexibility is established only by that outward channel like bulge of the second clamp member.

The clamp members are interconnected individually at the above mentioned ends with or without concuring fastening to the support structure, frame or part etc. In the latter case, the rigid clamp member is bolted through a bore in the depression. This will be particularly the case when the parts are hinged at one end and bolted at the other.

In the alternative, the interconnect bolting of the clamp members through threaded connection or clamping rods may combine the function of fastening the clamp (and particularly the rigid part) to a construction beam, flange, angle piece, flat bar etc. The clamping rods may carry hooks to grip under such construction part and the rigid clamp member is tightened thereto, bearing also against the construction part.

The clamping rods may alternatively be provided with shoes or other clamp pieces, held on the rods by nuts and being tightened against the construction parts. Different types of clamping rods can be used in conjunction with different types of construction parts to which the clamp is to be fastened, without having to change the construction of the clamp as such.

Utilization of straight clamping rods with additional clamping pieces and adaptors are particularly advantageous for reasons of simplicity. Decisive is that e.g. a nut may tighten the clamping piece against the support and construction part, so that the latter is sandwiched by that piece and the rigid clamp member which in turn is held in position by another nut.

Bolts and nuts are used extensively in the various constructions to hold the clamp members together and fastening them to a support. Nuts can be used here also as spacers, and wherever nuts are threaded on a bolt and sandwich a clamp member portion between them, they provide mutual securing through counter action.

Whenever the rigid clamp member is bolted to a support through its depression, the ends of the members are usually interconnected without additional fastening to the support. If the depression is off center, the ends of the members are oriented obliquely which permits space saving and closer positioning of plural clamps for parallel running waveguides. Also, hinge connection on one side is of advantage here. Otherwise, and for a centrally located depression, one will use two separate bolts with heads for fastening the ends of the clamp members together.

The first, more rigid clamp member may be for example mounted to the construction part to which the clamp is to be connected as a whole, even before that construction part has been actually used and installed, while the second clamp member is fastened to the first one in a very simple fashion, after the waveguide on the other cable has been put into place.

The second clamp member and here particularly the flat arms on both ends are preferably provided with elongated slots, being narrow at one end to accommodate a bolt and being of wider contour at the other end to permit passage of a nut. These slots permit prethreading of all nuts on the bolts which will interconnect the clamp members so that upon completion of the clamp any handling of loose nuts is not necessary; merely final tightening of such nuts is needed for fastening the slipped-on second clamp member to the first one after the cable or waveguide has been placed inbetween.

The clamps permit staggering in that one is fastened by means of clamping bolts to another one. Since the clamping bolts are laterally displaced from the cavity that receives the cable or waveguide, they do not interfere with mounting one waveguide above another one in that fashion.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a front view (in direction of a waveguide to be held) of a clamp as positioned in accordance with the preferred embodiment of the invention;

FIG. 2 is a top view of the device of FIG. 1;

FIGS. 3 and 4 show the same clamp in side view (a portion only as to FIG. 4) but being fastened to different support and construction parts and in a different manner;

FIG. 6 is a side view of a staggered arrangement of such clamps;

FIG. 7 is a front view of a modified clamp, as another example of the preferred embodiment; and FIGS. 8 and 9 are respectively side and top views of the clamp of FIG. 7.

Proceeding now to the detailed description of the drawings, the clamp shown in FIG. 1 is basically comprised of two numbers 1 and 8, complementing each other to receive a waveguide and holding it gently. The lower clamp member 1 has a cylindrically curved but semicylindrical portion 5 from which extend laterally two flat arms 2. Each of these arms has a bore 4. The flanges 3 extend at right angles from these arms and respectively down. As can be seen from the cross-section, member 1 is relatively thick and, therefore, quite rigid and inflexible. Its curved, inner contour matches the outer dimensions of a waveguide quite accurately.

The bottom of curved portion 5 is depressed by a circular flat bottom indentation 6 with a central bore 7. The downward facing edges of flanges 3 and the outer bottom of indentation 6 are situated in about the same plane.

The upper clamp member 8 has likewise horizontal arms 9, 9' and a circular or cylindrically curved portion. This semicylindrical portion is established by two curved segments 11, 11' each covering less than 90° and which are joined by an outwardly bulging, channel like or arch shaped part 12. These curved segments 11, 11' have likewise contour matching the contour of a waveguide. In the illustrated disposition, the contour of portions 5, 11 and 11' completes or outlines a circle and a waveguide of like diameter can be placed inbetween and held in position.

Indented crimps or corrugations 13 have been pressed into the transition from curved portions 11, 11' to the respective arms 9 and 9'. The (axial) edges of curved portions 11, 11' are flanged up at 14; these flanges face axially outwardly, so that each of the flat arms 9, 9' together with the respective curved segment 11, 11' constitute a stiffened unit, and these stiff units are flexibly interconnected by the corrugation like bulge 12. Thus, upon tightening each arm plus curved segment a unit of upper member 8 is not deformed, but any clamping deformation that occurs is taken up by the connecting corrugation or bulge 12.

Each of the arms 9, 9' has a round aperture 16 merging into an elongated slot 15. The size of aperture 16 is sufficient so that nuts such as 21, 22 can pass through. The transverse (horizontal) dimension of slot 15 is smaller than the outer dimension of such nut, but sufficient to receive and being passed through by the threaded shank portion 10 of a clamping rod 17.

FIGS. 1 and 2 show the clamping members 1, 8 fastened to an angle profile having a horizontal portion 20 and a vertical portion 19. The fastening is provided by these rods 17. As stated, each rod has a vertical shaft or shank portion 10 which is threaded. The rods each have a hook portion 18 that grips around the bottom edge of flange 19.

The arrangement is assembled as follows. The two fastening rods 17 are placed into the illustrated position. Next, clamp member 1 is positioned in that the two threaded shank portions 10 traverse the bores 4, and the edges of flanges 3 as well as the bottom of depression 6 is seated on flat flange 20. Next the nuts 21 are threaded onto the shanks 10 to tighten the member 1 against the flange 20 whereby the legs 3 now provide adequate support so that in turn fastening rods 17 are firmly positioned.

The subassembly as described thus far is assembled in that manner in preparation for installing a waveguide. As part of that preparation one may thread also nuts 22 onto the shanks, not in final position, but merely for safekeeping and storing. This particular subassembly may actually be completed at any time e.g. even prior to using the construction or support part 19, 20 in the construction e.g. of an antenna tower.

Whenever the construction has been completed, a waveguide is being laid into the cradle like portion 5 of positioned and fastened clamp member 1, and now member 8 is placed on top in that the openings 16 are to receive shanks 10 and pass nuts 22, whereupon member 8 is shifted laterally so that it rests on nuts 21, and shanks 10 traverse the end portion of openings 15. Nuts 22 are now tightened and thereby part 8 is tightened against the waveguide. The two nuts 21, 22 on each arm 9 or 9' sandwich the arms inbetween, and the two nuts are held safely in position against any loosening by counter action.

FIG. 3 illustrates the same pair of clamping elements 1, 8 but in side view (e.g. from the right in FIG. 1) and with a different clamping rod. That rod 28 is a straight, threaded bolt having at its lower end a clamping piece 32 which is held by a threaded nut 29 until clamp 32 abuts the lower edge of flange 19. The clamp member 1 is actually seated here between the additional nut 33 and the nut 21. The clamping piece 32 has a hook shaped portion to grip behind flange 19 whereby particularly rods 28, lower clamp member 1, clamping pieces 32 and the several nuts constitute a unit. This way, the lower clamp 1 is fastened to angle piece 19, 20. The upper member 8 is fastened to the lower member 1 as was described above.

FIG. 4 illustrates a modification but only as far as the structure is concerned to which the clamp is fastened. That structure is a flat rail 38 which is sandwiched inbetween the other side (as compared with its use in FIG. 3) of clamp 32 and the arms 3 of clamp member 1. The nut 29 tightens also here the clamp plus rod assembly to the support 38.

The two part clamp as shown in FIG. 5 is still the same as in the preceding Figures, but the interconnection and fastening differs. It is assumed that the clamp is to be fastened to a rail 27 of a support frame or the like, and that this rail has bores 26 which can receive bolts such as 23.

The lower clamp member 1 is fastened to rail 27 by means of that bolt 23, and nuts 24 hold the bottom of the depression 6 against that rail, whereby the bolt traverses the opening 7 of that depression 6 whose function is also to receive the upper nut without interference with the cable or waveguide to be inserted and held by the clamp.

The upper and lower clamp members 1 and 8 are held together here by individual bots 25 with heads 25', spacer nut 21 and positioning nut 22. The bolts with nuts 21 are placed in position on member 1 prior to installing the part, the additional nut 22 can be temporarily stored on the respective fastened bolt 25. After the waveguide has been placed in the cradle 5 as defined by clamp member 1, the other member 8 is fastened thereto just as before by slipping opening 16 over loosened nuts 22, followed by lateral shifting of member 8 and tightening of nuts 21 around the respective ends of the two openings 15 on both arms. The nuts 21 and 22 of each pair hold each other by counter action.

This particular mode of fastening will be used for example when the support structure to which clamp member 1 is to be fastened has an angle. Flanges 3 may still bear against the support.

The assembly shown in FIG. 6 is the same as in FIG. 3 as far as the bottom portion is concerned in that a first clamp is fastened to angle piece 19, 20. A second clamp whose parts are identified by similar numbers with the letter-a-added, is now fastened to the flat legs 9, 9' of the first clamp by means of straight bolts or rods 36. One uses here a pair of second bores 34 in clamp member 1. These bores have no function in the single assembly of FIGS. 1 and 2 but are used in the staggered arrangement of FIG. 6 to receive the lower ends of rods 36, and nuts 35, 37 tighten the rods 36 to clamp member 1 around the openings 34. Since the wide portions 16 of the slots in member 8 are aligned with openings 34, member 8 does not interfere with this connection. Nuts 35 readily pass through these wide portions 16.

The two clamps have slightly off-set disposition in relation to the axes of the waveguides to be clamped and held. Particularly, however, the waveguides can be placed one on top of each other at a spacing that is essentially determined by the length of these clamping and fastening bolts 36.

It can readily be seen that the same basic clamp structure can be used in a variety of different ways for fastening whereby the differences are accomodated by different fastening rods and bolts.

In cases, however, several clamps have to be positioned on the support very close to each other. In this case, the dividing line or plane between the two clamp parts should be inclined by about 45° relative to the support plane rather than coplanar as shown in the various examples above. The modified clamp as shown in FIGS. 7, 8 and 9 has additionally the feature of hinging, rather than two sided bolting as used in the clamp of FIGS. 1 to 6.

The clamp shown in FIGS. 7, 8 and 9 has two clamping members 1' and 8', whereby part 1' is again made of relatively thick and strong metal strip and will not or hardly deform but holds its curved contour. The lower clamping member has a round depression 6' with a bore, and a cylinder bolt 23 with a head bolts member 1' to frame part or support 27'. Part 27' may also be a construction element of a tower for a transmitter antenna, and the connection here can also be understood as a preparatory subassembly.

The main portion of clamp member 1' is of cylindrical contour spanning about 180° and matching the outer contour of the waveguide to be inserted. The depression 6' is offset to the side, near one of the fastening ends 41. Member 1' has an outwardly crimped tongue 43 at one end, and flat, flange like arm 44 at the other end.

The upper clamp member 8' is made of thin, resiliently deformable metal strip, having two curved segments separated (but, of course, joined) by a trough or channel 12 of outwardly bulging corrugation like configuration. The member 8' has axial flanges for stiffening as well as indents or corrugations at the point where an arm 46 extends from the curved portion so that any resiliency that is effective is essentially provided by the flexible corrugation 12.

One end of clamp member 8' is continued to a straight, flat leg 45 having an aperture 45a through which grips tongue 43 and establishes therewith a releasible hinged connection serving as connection 41. The other end of clamp member 8' is provided with the flat arm 46 which extends parallelly to arm 44 of clamp member 1'. A bolt 47 with head interconnects the two arms 44 and 46 and spaces them. This connection is the second connection 42 of the two clamp members. Upon inserting bolt 47 and tightening, the bulge portion 12 provides for whatever resilient reaction is needed when a cable or waveguide is inserted, to hold and grip around that waveguide, with any resilient deformation taking place at bulging corrugation 12.

As can be seen best from FIG. 7, the lateral dimensions of the clamp are such, that the upper connection 42 is essentially situated above the (in the drawings) rightwardly curving portion of member 1', and the hinge 41 is located essentially below the leftward bulging portion of member 8'. Thus, neither connection projects far beyond the horizontal, transverse dimensions of a cable or waveguide to be inserted and held. The two connections 41, 42 have an orientation of 45° to the plane of fastening the clamp to other structure, so that one can place the waveguides closer (laterally) than as compared with the smallest spacing permitted with the other type of clamp. Thus, other such cable and waveguides can be held by clamps of like construction directly to the left and to the right of the one illustrated. Instrumental here is further that the clamps be arranged with like orientation so that lower or upper connections of juxtaposed clamps do not face each other. Hinging is an added advantage facilitating the assembly, but is not limited to the 45° orientation.

In operation, one will again begin with a subassembly in that member 1' is bolted to frame 27'. Upon installation, the cable or waveguide is layed into member 1'. Next, part 8' is hinged to member 1' by insertion of tongue 43 into opening 45a whereupon member 8' is folded up and around the waveguide and bolts to member 1' by interconnecting arms 44 and 46 as illustrated.

It should be noted that the disposition of hinge 41 and bolting connection 42 could be reversed, but the illustrated version is clearly preferred for ease of access. Another modification is the exchanged location of opening 45a and of tongue 42, the latter may readily be made a part of the end of member 8' while the end of member 1' could be provided with the opening into which the tongue is to be inserted.

The invention is not limited to the embodiments described above but all changes and modifications thereof not constituting departures from the spirit and scope of the invention are intended to be included.

We claim:

1. Clamp for pressure sensitive cable such as waveguides or the like which must not be deformed by the clamp by means of which such a cable is to be fastened to and held and positioned on frames or other construction parts, comprising:

a first, relatively rigid or stiff and inflexible member of semicylindrical contour and having a portion constructed for engagement with a flat support surface of a construction part, further having a pair of flat arms extending respectively from aximuthal ends of the member and provided for bolting, said arms each continuing in bent-off portions with coplanar edges;

a second clamp member having two, relatively stiff and inflexible, cylindrically curved segments which define a semicylindrical contour and being joined by an outwardly bulging, corrugation like, flexible portion, the second clamp member having also a pair of flat arms extending respectively from azimuthal ends of the curved segments of the second clamp member;

means for connecting the two pairs of arms together; and means for connecting the first member to the construction part.

2. Clamp as in claim 1 wherein the first clamp member has a circular outwardly directed depression having a bore.

3. Clamp as in claim 2, said depression being symmetrically disposed with respect to said semicylindrical contour of the first clamp member.

4. Clamp as in claim 2, said depression being close to one of said flat arm and said means for fastening of said first clamp member and remote from the respective other one.

5. Clamp as in claim 1 each said arms provided with apertures for traversal by a clamping rod, and a pair of clamping rods constituting said means for connecting the first member, traversing respectively the first mentioned arms of the first and second clamp members, and the second arms thereof; and nuts constituting, together with the rods, the means for connecting the arms together, and being threaded on the rods to fasten the members to each other.

6. Clamp as in claim 5, the apertures of the second clamp member being elongated slots, enlarged at one end for passage of nuts on said rods.

7. Clamp as in claim 5, said rods having hook-like ends for gripping around flange parts onto which the clamps are to be fastened.

8. Clamp as in claim 5, there being spacer nuts interposed between the arms, and at least one additional nut on the respective other side of an arm.

9. Clamp as in claim 1, wherein the two means for connecting include a pair of clamping rods traversing said arms to hold the two clamp parts together, and means on the rods for holding the first part on the construction part.

10. Clamp as in claim 9, wherein the means on the rods respectively are gripping hooks engaging the construction part.

11. Clamp as in claim 9, wherein the means of the rods are clamping pieces held against the construction part by nuts, the construction part being sandwiched between said clamping pieces and said portion as constructed for engagement.

12. Clamp as in claim 11, wherein the clamping pieces each have a flat and an angled portion provided for engagement with the structure part.

13. Clamp as in claim 12, wherein the two means for connecting includes a pair of bolts with at least two nuts each and a third nut or head per bolt, tightened against said arms so that a centrally positioned one of said nuts serves as spacer for each pair of interconnected arms.

14. Clamp as in claim 13, said means for fastening of the first clamp member and said means for cooperation being releasible hinge parts which together establish a hinge.

15. Clamp as in claim 14, said location being a depression in the first member.

16. Clamp as in claim 14, said means for fastening of the first clamp member and said means for cooperation being releasable hinge parts which together establish a hinge.

17. Clamp for pressure sensitive cable such as waveguides or the like which must not be deformed by the clamp, by means of which such a cable is to be fastened to and held and positioned on frames or other construction parts, comprising:

a first, relatively rigid or stiff and inflexible member of semicylindrical contour and having a portion constructed for engagement with a flat support surface of a construction part, further having a flat arm extending from one azimuthal end of the member and provided for bolting, and a means at the opposite end provided for additional fastening;

a second clamp member having two, relatively stiff and inflexible, cylindrically curved segments which dfeine a semicylindrical contour and being joined by an outwardly bulging, corrugation like, flexible portion, the second clamp member having a flat arm extending from one azimuthal end of one of the curved segments of the second clamp member, and having a means for cooperation with the means for cooperation with the means for fastening of the first clamp member to connect the two clamp members together; stiffening corrugation like indents in transition zones between the curved portions of the second clamp member and respectively the flat arm and the means for cooperation of the second clamp; means for connecting the two arms together; and means for connecting the first member to the construction part.

18. Clamp for pressure sensitive cable such as waveguides or the like which must not be deformed by the clamp, and by means of which such a cable is to be fastened to and held and positioned on frames or other construction parts, comprising:

a first, relatively rigid or stiff and inflexible member or semicylindrical contour and having a portion constructed for engagement with a flat support surface of a construction part, further having a flat arm extending from one azimuthal end of the member and provided for bolting, and a means at the opposite end provided for additional fastening;

a second clamp member having two, relatively stiff and inflexible, cylindrically curved segments which define a semicylindrical contour and being joined by an outwardly bulging, corrugation like, flexible portion, the second clamp member having a flat arm extending from one azimuthal end of one of the curved segments of the second clamp member, and having a means for cooperation with the means for fastening of the first clamp member to connect the two clamp members together;

means for connecting the two arms together and being oriented so that the latter means and the flat arm of the first member are in line which has an angle of about 45° to a plane of engagement of the construction part and the first member at a location of the means for connecting the first member to the construction part; and means for connecting the first member to the construction part.

* * * * *